United States Patent [19]
Hempelmann

[11] Patent Number: 5,959,790
[45] Date of Patent: Sep. 28, 1999

[54] BREAKAWAY MIRROR CONSTRUCTION AND METHOD OF ASSEMBLY

[75] Inventor: Heinrich J. Hempelmann, Farmington Hills, Mich.

[73] Assignee: Harman Automotive, Inc., Farmington Hills, Mich.

[21] Appl. No.: 08/783,612

[22] Filed: Jan. 14, 1997

[51] Int. Cl.[6] .............................. G02B 5/08; G02B 7/182; B60R 1/06
[52] U.S. Cl. ......................... 359/841; 359/872; 248/479; 248/549; 248/900
[58] Field of Search ................................... 359/841, 872; 248/549, 479, 900

[56] References Cited

U.S. PATENT DOCUMENTS

| | | |
|---|---|---|
| 3,838,608 | 10/1974 | Hadley . |
| 3,917,212 | 11/1975 | Hadley et al. . |
| 3,918,319 | 11/1975 | Mills . |
| 3,966,162 | 6/1976 | Hadley . |
| 4,158,483 | 6/1979 | Fisher et al. . |
| 4,182,182 | 1/1980 | Stortz . |
| 4,315,113 | 2/1982 | Fisher et al. . |
| 4,356,357 | 10/1982 | Fisher . |
| 4,401,289 | 8/1983 | Fisher et al. . |
| 4,628,760 | 12/1986 | Huddleston . |
| 4,679,758 | 7/1987 | Boddy et al. ........................... 248/900 |
| 4,740,066 | 4/1988 | Whitehead ............................... 359/841 |
| 4,830,327 | 5/1989 | Fimeri . |
| 4,836,491 | 6/1989 | Fimeri . |
| 4,840,475 | 6/1989 | Herzog et al. .......................... 359/841 |
| 4,856,885 | 8/1989 | Fimeri . |
| 4,867,409 | 9/1989 | Fimeri . |
| 4,881,418 | 11/1989 | Fimeri . |
| 4,904,074 | 2/1990 | Gilbert . |
| 4,919,525 | 4/1990 | Gilbert . |
| 4,922,382 | 5/1990 | Hobbins . |
| 4,932,766 | 6/1990 | Harry ..................................... 359/841 |
| 4,941,639 | 7/1990 | Sakao ..................................... 248/549 |
| 4,951,912 | 8/1990 | Manzoni ................................. 359/841 |
| 5,124,846 | 6/1992 | Seitz et al. ............................. 359/841 |
| 5,205,182 | 4/1993 | Gilbert . |
| 5,331,471 | 7/1994 | Gilbert . |

*Primary Examiner*—Ricky D. Shafer
*Attorney, Agent, or Firm*—Dykema Gossett PLLC

[57] ABSTRACT

A breakaway mirror assembly includes a housing forming a cavity therein. The housing has an opening in an end thereof. An applique is fixedly coupled to the door of an automotive vehicle. A pairs of springs has one end mounted to the applique on a pair of spring mounts. The other end of springs extend into the housing through the opening in the housing. An elongated bracket is connected to the opposite end of each spring. The spring force applied to the housing through the bracket holds the housing to the applique during operation of the automotive vehicle.

38 Claims, 3 Drawing Sheets

BREAKAWAY MIRROR CONSTRUCTION AND METHOD OF ASSEMBLY

BACKGROUND OF THE INVENTION

The present invention relates generally to rear view mirrors for automotive vehicles, and more specifically, to breakaway exterior rearview mirror and method of assembling the same.

Rearview mirrors are located on a vehicle to assist a vehicle operator to see what is behind the vehicle. Exterior rearview mirrors extend from the side of the vehicle. In many countries, exterior rear view mirrors are required to "break-away" to reduce accident hazard and damage to the vehicle. A break-away mirror assembly generally moves relative to the vehicle body if a force is applied to the mirror. For example, while driving in tight quarters such as a garage, if the mirror assembly contacts a post, the mirror will move without damaging the body of the vehicle. The general construction of a break-away mirror includes a mirror housing mounted to an applique on the vehicle. The applique is a generally low profile component which is fixedly mounted to the vehicle. The mirror housing encloses a mirror and its adjustment mechanism. The applique provides the point about which the housing moves with respect to the vehicle. "Breaking away" refers to the housing moving with respect to the applique upon an application of force to the housing.

After break-away, it is desirable to return the housing to the applique in its original position. Commonly, a spring is employed to return the housing back together with the applique after a force is applied. One known method for employing a spring is mounting each end of the spring to the applique and looping the spring around the inside of the mirror housing.

One problem with conventional spring mounted breakaway mirror assemblies is that the spring may interfere with other components within the mirror housing. Within the mirror housing, an adjustment mechanism for moving the mirror is commonly employed to adjust the mirror to the vehicle operator's desired position. It is undesirable to have the adjustment mechanism move or rub against the spring particularly during adjustment since an undesirable noise is generated.

In previous configurations objectionable noise in previous configurations is also generated as the mirror breaks away. During break-away, the spring rubs against the housing and adjustment mechanism to generate an objectionable grinding noise.

Typically, the assembly of a breakaway mirror is commonly a labor intensive operation requiring a significant amount of manpower. Reducing the amount of time to assemble a mirror, reduces labor cost and thus lowers the cost of the product. Reduction of cost is a common goal in such a competitive industry.

It would be desirable to eliminate time consuming processes such as installing threaded fasteners to hold the mirror assembly together. In mass production eliminating a few small components and steps when multiplied over the typical volume of an automotive vehicle can significantly reduce the cost of the component.

It would also be desirable to eliminate objectionable noise in the operation of the vehicle to increase customer satisfaction with mirror assemblies while reducing the labor cost and thus the overall cost of the component.

SUMMARY OF THE INVENTION

The breakaway mirror of the preset invention includes a housing forming a cavity therein. The housing has an opening in an end thereof. An applique is fixedly coupled to the door of an automotive vehicle. A pairs of springs each have one end mounted to the applique on a pair of spring mounts. The springs preferably remain parallel during forward and rearward breakaway and preferably remain perpendicular to the radius of breakaway regardless if forward or rearward. The other end of each of the pair of springs extend into the housing through the opening in the housing. An elongated bracket is connected to the opposite end of each spring. The spring force applied to the bracket holds the housing to the applique during operation of the automotive vehicle.

One advantage of the present invention is that the spring force is used as a means for holding the break away mirror assembly together as well as a means for returning the mirror housing to the applique upon breakaway. The spring urges the housing against the applique by urging the bracket within the housing into engagement with the housing without additional fasteners. Thus, the mirror assembly is easy to assemble and is less expensive than prior art assembles.

In one aspect of the invention, the bracket may have a curvature along the length thereof. Each of the springs are preferably located within a guide formed on the bracket that extends along the length and follows the curvature of the bracket. The curved bracket prevents the spring from interfering with the power pack used for moving the position of the mirror. This configuration also has the additional advantage that the spring is prevented from rubbing against the housing during breakaway, both in the forward direction and in the rearward direction.

In another aspect of the invention, the method for assembling the break-away mirror includes the steps of connecting the first end of the first spring to an applique and connecting the first end of the second spring to an applique. The first and second springs are inserted through an opening in the housing. The second end of the first spring and the second end of the second spring are connected to the elongated bracket that is yet to be engaged with the housing. The mirror assembly is held together by stretching the bracket and the springs in a direction away from the applique. The bracket is then preferably fixedly coupled to the mirror housing in two positions near either end of the bracket.

In one aspect of the method for assembling the breakaway mirror, a pair of keys integrally formed near each end of the bracket are engaged with a pair of slots located within the mirror. The springs urge the bracket into the slots and thus urge the housing against the applique.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Figure 1:
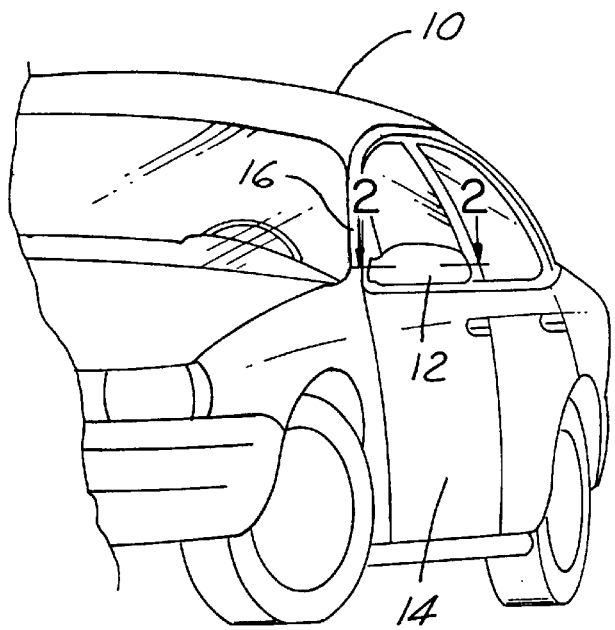
FIG. 1 is a fragmentary perspective view of an automotive vehicle having a breakaway mirror according to the present invention.

Referring now to the drawings, like reference numerals are used to identify identical components in the various views. Although the invention will be illustrated in the context of a driver side door, it will be appreciated that this invention will be used with other applications requiring a breakaway mirror.

Referring now to FIG. 1, an automotive vehicle 10 is shown having breakaway mirror assembly 12 on vehicle door 14. The terms interior, exterior, rearward and forward, as used in this description, are related to the mirror assembly as installed on automotive vehicle 10. Breakaway mirror assemblies are most commonly mounted on vehicle door 14, although, breakaway mirror assembly 12 may be mounted to a portion of automotive vehicle 10 such as an A-Pillar 16. Breakaway mirror assembly 12 is designed to move relative to automotive vehicle 10 upon the application of a predetermined force. That is, mere wind force will not displace breakaway mirror assembly 12. Commonly, the movement of breakaway mirror assembly 12 with respect to automotive vehicle 10 is in a forward or rearward direction.

Figure 2:
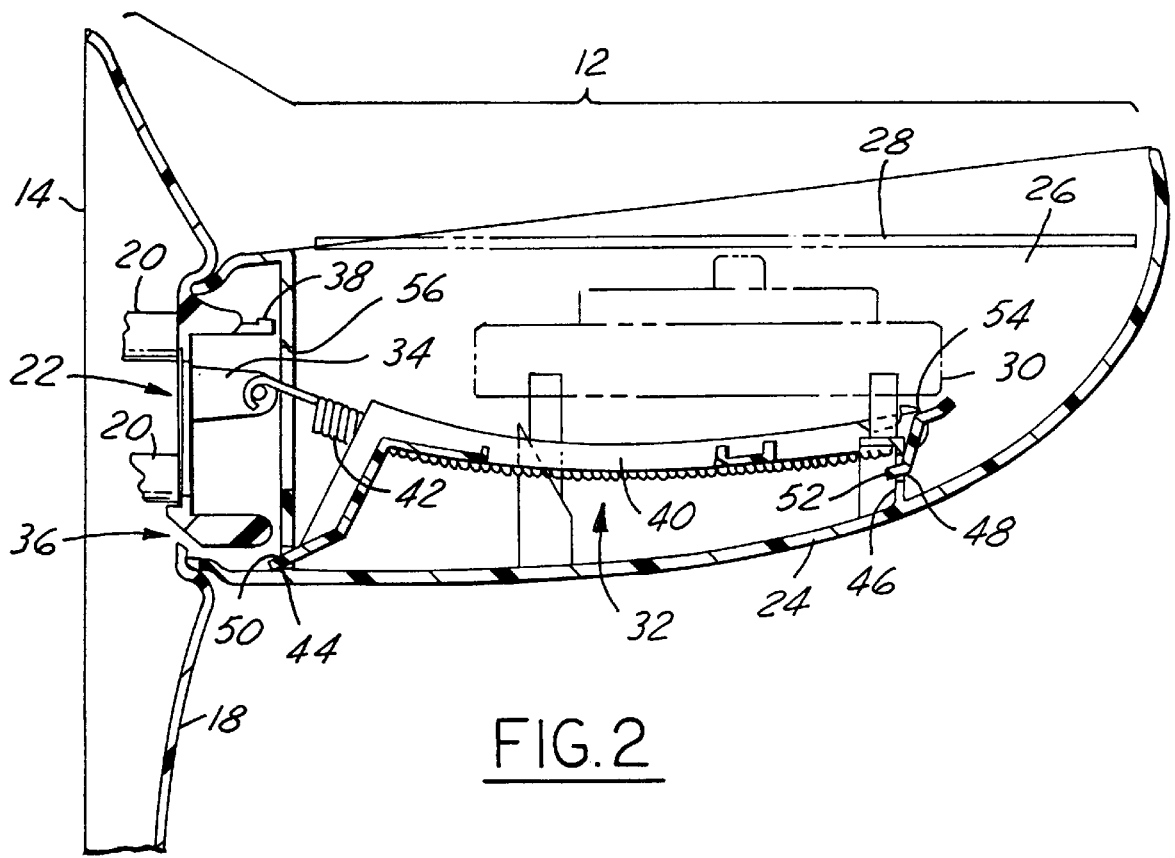
FIG. 2 is a cross-sectional view of a breakaway mirror taken along line 2—2 of FIG. 1.

Referring now to FIG. 2, breakaway mirror assembly 12 is shown in its normal operating position. Breakaway mirror assembly 12 has an applique 18 and a housing 24.

The applique 18 is fixedly mounted to vehicle door 14 through mounting bolts generally shown at 20. Applique 18 has a receptive portion 22 shaped to receive an end of housing 24. Housing 24 generally defines a cavity 26 sized to receive a mirror 28 and a mounting assembly 32. Both applique 18 and housing 24 may be made of a plastic material, commonly they are colored black or painted to match the vehicle color.

Mirror 28 is preferably a planar or convex piece of mirror glass, which is common in the art. As is common mirror 28 may be mounted to a plastic base plate (not shown). The base plate provides a location to connect the mirror to its movement mechanism.

Power pack 30 is coupled to mirror 28 to move mirror 28 with respect to housing 24. Power pack 30 is controlled in a conventional manner by a switch (not shown) located within automotive vehicle 10. Power pack 30 may be any number of power packs commonly known in the art. One example of a breakaway mirror is found in a copending and commonly assigned application entitled, "POWER PACK FOR CONTROLLING THE ANGULAR POSITION OF A VEHICLE REARVIEW MIRROR" [attorney docket number 64456-007] which is hereby incorporated by reference herein.

A spring mount 34 pivotally fixed with respect to the applique may be integrally formed with applique 18. Spring mount 34 may also be a separate price attached to applique 18. Applique 18 may also have an integrally formed forward catch 36 and a rearward catch 38 which are each used to prevent movement of housing 24 beyond a predetermined angle with respect to applique 18. Further description on the operation of forward catch 36 and rearward catch 38 is provided below.

Mounting assembly 32 has an elongated bracket 40 which engages housing 24. Bracket 40 is used to mount a pair of springs 42 between bracket 40 and spring mount 34. When mounted, springs 42 are in tension and provides a force on bracket 40 which in turn provides a force on housing 24 to urge housing 24 against applique 18 during normal vehicle operation.

Housing 24 has an inward slot 44 into which one end of bracket 40 is inserted. Housing 24 also preferably has a bracket mount 46 having a slot 48 into which the opposite end of bracket 40 is secured. Bracket 40 has a key 50 which is inserted into inward slot 44 and a key 52 on the opposite end of bracket from key 50 which is inserted into slot 48. To assemble breakaway mirror assembly 12, spring 42 is mounted to a bracket spring mount 54 on the outward end of bracket 40. Spring 42 is also connected to spring mount 34 through an opening 56 in housing 24. Bracket 40 is used to stretch springs 42 in an outward direction then keys 50 and 52 are brought into engagement with inward slot 44 and slot 48, respectively. When the keys 50 and 52 are engaged in slots 44 and 48, springs 42 urge the bracket 40 and housing 24 against applique 18. Thus, no screws or other fasteners are required to mount housing 24 to applique 18.

A gasket 66 may be placed between applique 18 and the door in a conventional manner. Gasket 66 may reduce air leakage into passenger compartment though the openings where mounting bolts 20 (FIG. 5) are inserted.

Figure 3:
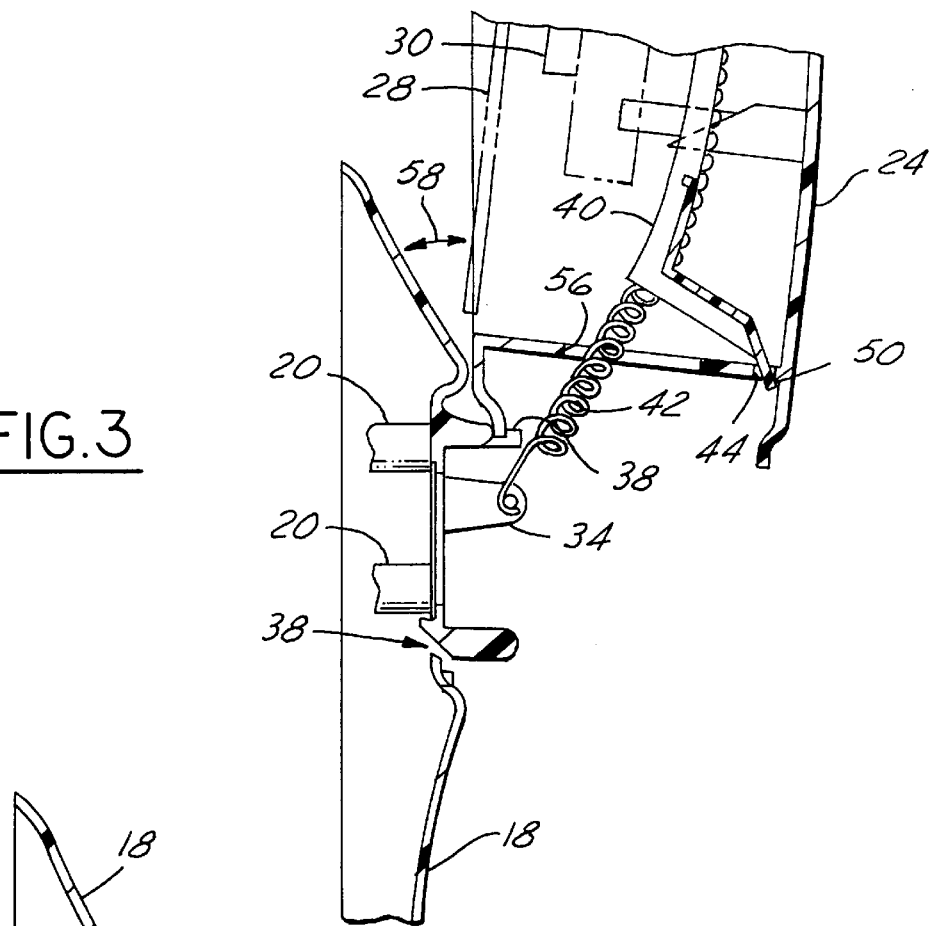
FIG. 3 is a fragmentary cross-sectional view of a breakaway mirror shown in a rearwardly extended position.

Referring now to FIG. 3, housing 24 is shown in its rearward most position with respect to applique 18. As shown, the curvature of a major length of bracket 40 is used to guide the contacting spring 42 from interfering with components within mirror housing or applique 18 such as opening 56 or rearward catch 38. By increasing the length of rearward catch 38, that is, by increasing the distance that rearward catch 38 extends from applique 18, the angle 58 between housing 24 and applique 18 may be designed to any desirable angle. After a displacing force is released from housing 24, spring 42 which has a major portion of its length contacting the bracket curvature will urge housing 24 against applique 18 in its normal operating position. When the housing 24 is displaced, springs 42 preferably are perpendicular to the radius of the curvature through which the housing 24 rotates with respect to applique 18. The perpendicularity helps urge the housing 24 together with the applique 18 when displaced.

Figure 4:
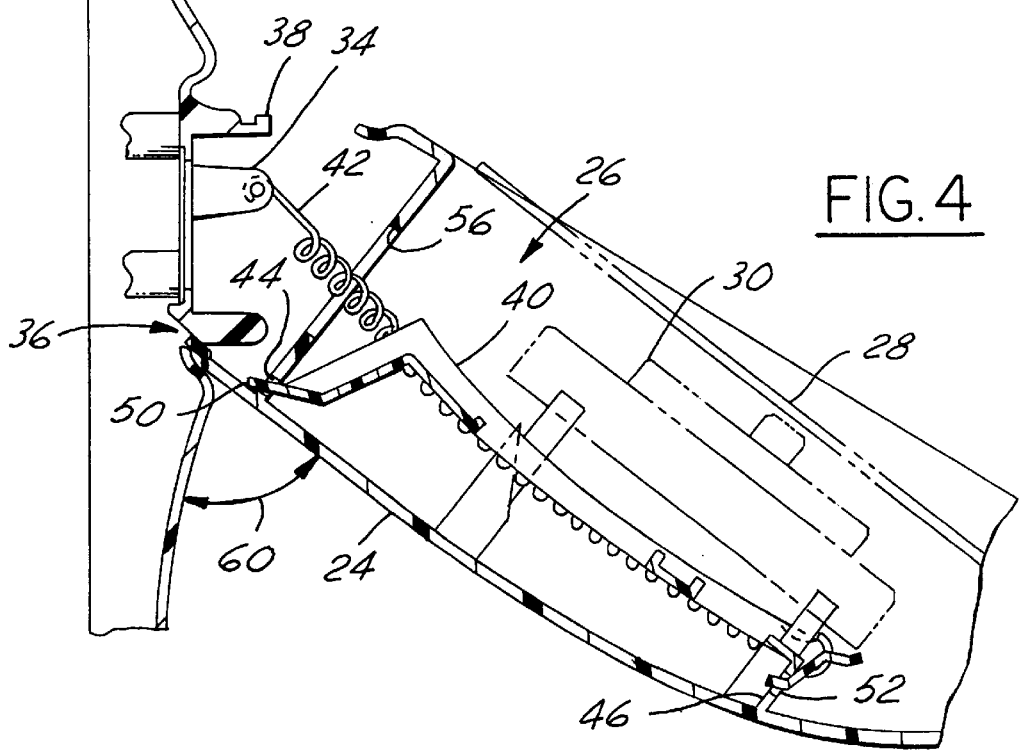
FIG. 4 is a fragmentary cross-sectional view of a breakaway mirror in a forwardly extended position.

Referring now to FIG. 4, housing 24 is shown in its forward most position. In the forward most position, housing 24 engages forward catch 36 to prevent the movement of housing 24 past a predetermined angle 60 with respect to applique 18. Due to the arc shape of bracket 40, spring 42 does not interfere with opening 56 or any components within cavity 26. Springs 42 are also preferably perpendicular to the radius of the curvature through which the housing 24 rotates with respect to applique 18. The curvature of the bracket helps maintain the perpendicularity. The perpendicularity helps urge the housing 24 together with the applique 18 when displaced.

Figure 5:
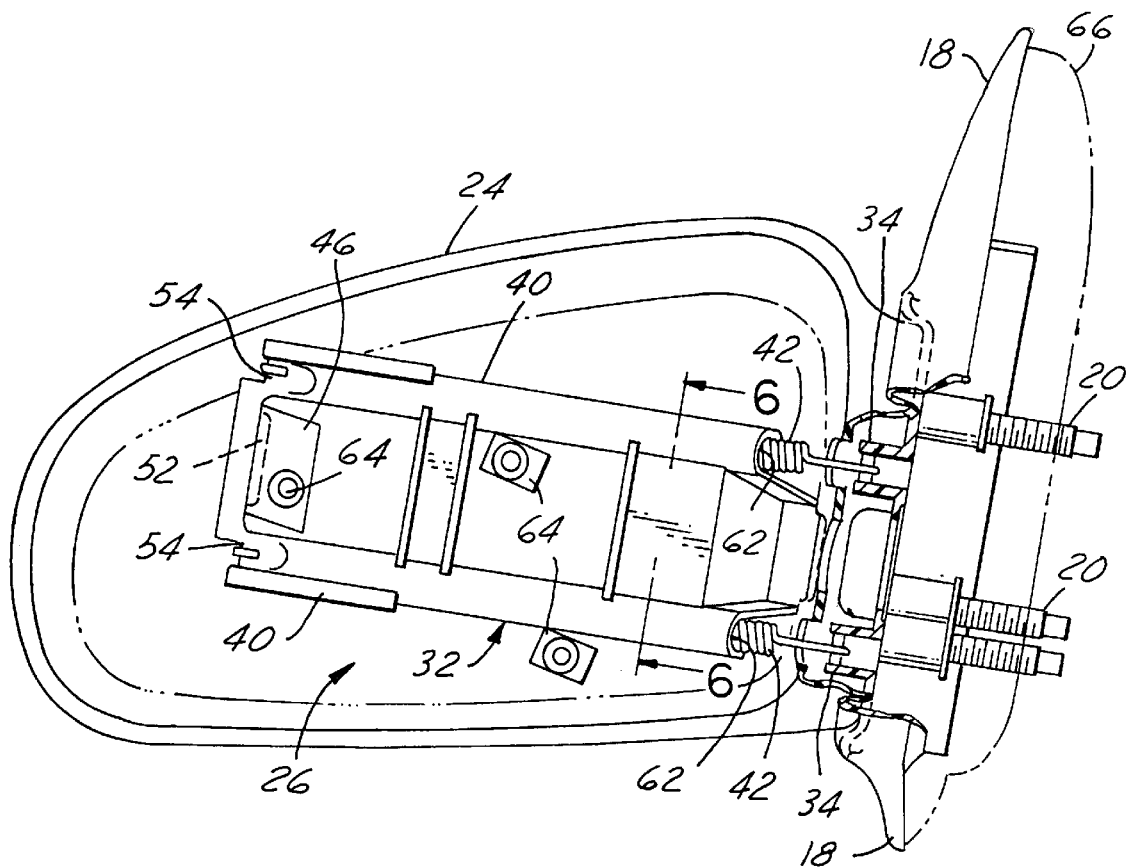
FIG. 5 is a partial cross-sectional view of a breakaway mirror assembly with the mirror glass removed.

Referring now to FIG. 5, a forward looking view of bracket 40 within cavity 26 without mirror 28 is shown. Springs 42 are preferably parallel when connected to bracket 40 and to spring mounts 34. Bracket may have a semi-circular guide or channel 62 into which springs 42 rest. Because springs 42 are located between housing 24 and bracket 40, guide 62 of bracket 40 prevent springs 42 from contacting other components within the cavity 26 of the housing 24 such as a power pack (which is not illustrated in FIG. 5 for simplicity). Power pack mount 64 may be integrally formed within housing 24 for fixing the power pack thereto.

Figure 6:
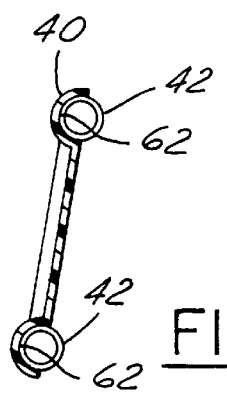
FIG. 6 is a cross-sectional view taken along line 6—6 of FIG. 5 through the bracket.

Referring now to FIG. 6, a cross-sectional view of spring 42 within guide or channel 62 of bracket 40 is shown as the mirror is moved to different points of contact between the spring 42 and the channel 62 exist.

While the best mode for carrying out the present invention has been described in detail, those familiar with the art to which this invention relates will recognize various alternative designs and embodiments for practicing the invention as defined by the following claims.

What is claimed is:

1. A breakaway mirror assembly for mounting to a door of an automotive vehicle comprising:
   a mirror;
   a housing defining a cavity sized to receive said mirror and having an opening;
   an applique proximate said housing, said applique having a pair of spring mounts;
   an elongated bracket mounted within said cavity, said bracket having a major length with a predetermined curvature therealong; and
   a pair of springs, each of said springs having a first end and a second end, said first end of said spring coupled to one of said pair of spring mounts, said second end of each of said pair of springs mounted to said bracket through said opening and said springs having a major portion of their lengths contacting with the predetermined curvature of the bracket.

2. A breakaway mirror assembly as recited in claim 1, wherein said springs are perpendicular to a radius of a curvature of rotation through which said housing rotates with respect to said applique in a forward direction or rearward direction.

3. A breakaway mirror assembly as recited in claim 1, wherein said bracket has a pair of guides connected thereto, each guide having one of said pair of springs associated therewith, said guides guiding said springs when said housing moves with respect to said applique.

4. A breakaway mirror assembly as recited in claim 3, wherein said guide is integrally formed with said bracket.

5. A breakaway mirror assembly as recited in claim 3, wherein said guides have one of said pair of springs affixed to said bracket at an end of said guide.

6. A breakaway mirror assembly as recited in claim 3, wherein said guides have a predetermined curve therealong.

7. A breakaway mirror assembly as recited in claim 3, wherein said guide has a semi-circular shape.

8. A breakaway mirror as recited in claim 1, further comprising a first stop on said applique to prevent said housing from rotating more than a first predetermined angle with respect to said applique when said applique is rotated in a rearward direction.

9. A breakaway mirror as recited in claim 1, further comprising a second stop on said applique to prevent said housing from rotating more than a second predetermined angle with respect to said applique when said applique is rotated in a forward direction.

10. A breakaway mirror as recited in claim 1, wherein said springs are substantially parallel.

11. A breakaway mirror as recited in claim 1, wherein said housing having a first slot formed therein and said bracket having a first key formed therein for insertion into said first slot.

12. A breakaway mirror as recited in claim 1, wherein said housing having a second slot and said bracket having a second key formed therein sized to be received within said second slot.

13. A breakaway mirror as recited in claim 12, wherein said second key is formed at an opposite end of said bracket than said first key.

14. A breakaway mirror as recited in claim 1, wherein said housing has a forward most position and a rearward most position with respect to said applique, said opening in said housing sized so that said pair of springs do not contact said housing in either said forward most position or said rearward most position.

15. A breakaway mirror as recited in claim 1, further comprising a gasket, said gasket located between said door and said applique.

16. An automotive vehicle comprising:
    a door;
    a mirror;
    a housing defining a cavity sized to receive said mirror and having an opening;
    an applique proximate said housing and fixedly mounted on or near said door, said applique having a pair of spring mounts;
    an elongated bracket mounted within said cavity, said bracket having a major length; with a predetermined curvature therealong; and
    a pair of springs, each of said springs having a first end and a second end, said first end of said spring coupled to one of said pair of spring mounts, said second end of each of said pair of springs mounted to said bracket through said opening and said springs having a major portion of their lengths contacting with the predetermined curvature of the elongated bracket.

17. An automotive vehicle as recited in claim 16, wherein said springs are perpendicular to a radius of a curvature of rotation through which said housing rotates with respect to said applique in a forward direction or rearward direction.

18. An automotive vehicle as recited in claim 16, wherein said bracket has a pair of guides connected thereto, each guide having one of said pair of springs associated therewith, said guides guiding said springs when said housing moves with respect to said applique.

19. An automotive vehicle as recited in claim 18, wherein said guides are integrally formed with said bracket.

20. An automotive vehicle as recited in claim 18, wherein said guides have one of said pair of springs affixed to said bracket at an end of said guide.

21. An automotive vehicle as recited in claim 18, wherein said guides have a predetermined curve therealong.

22. An automotive vehicle as recited in claim 18, wherein said guide has a semi-circular shape.

23. An automotive vehicle as recited in claim 16, further comprising a first stop on said applique to prevent said housing from rotating more than a first predetermined angle with respect to said applique when said applique is rotated in a rearward direction.

24. An automotive vehicle as recited in claim 16, further comprising a second stop on said applique to prevent said housing from rotating more than a second predetermined angle with respect to said applique when said applique is rotated in a forward direction.

25. An automotive vehicle as recited in claim 16, wherein said springs are substantially parallel.

26. An automotive vehicle as recited in claim 16, wherein said housing having a first slot formed therein and said bracket having a first key formed therein for insertion into said first slot.

27. An automotive vehicle as recited in claim 26, wherein said housing having a second slot and said bracket having a second key formed therein sized to be received within said second slot.

28. An automotive vehicle as recited in claim 27, wherein said second key is formed at an opposite end of said bracket than said first key.

29. An automotive vehicle as recited in claim 16, wherein said housing has a forward most position and a rearward most position with respect to said applique, said opening in said housing sized so that said pair of springs do not contact said housing in either said forward most position or said rearward most position.

30. An automotive vehicle as recited in claim 16, further comprising a gasket, said gasket located between said door and said applique.

31. A method of assembling a breakaway mirror assembly for an automotive vehicle with the mirror assembly having a housing defining a cavity to receive a mirror and having an opening, an applique and an elongated bracket, said method for assembling comprising the steps of:

connecting a first end of a first spring to the applique;

connecting a first end of a second spring to the applique;

inserting said first spring through the opening in the housing adjacent the applique;

inserting the second spring through the opening in the housing adjacent the applique;

connecting a second end of the first spring to a first end of the bracket;

connecting a second end of the second spring to the first end of the bracket;

stretching the bracket and said first and second springs in a direction away from the applique;

coupling the bracket within the mirror housing;

contacting a major portion of a length of said springs with a predetermined curvature along a major length of the bracket; and urging the bracket together with the housing toward said applique using said first and second springs.

32. A method of assembling a breakaway mirror as recited in claim 31, wherein said bracket has a second end and said step of coupling further comprises a step of coupling a first end of the bracket within the housing and coupling the second end of the bracket to the housing.

33. A method of assembling a breakaway mirror as recited in claim 32, wherein the steps of coupling the first and second ends of the bracket includes inserting a key of the first end of the bracket into an outward slot of the housing and inserting a key of the second end of the bracket into an inboard slot of the housing wherein said first and second springs are parallel connecting the housing with said applique.

34. A breakaway mirror assembly for mounting to a door of an automotive vehicle comprising:

a mirror;

a housing defining a cavity sized to receive said mirror and having an opening and said housing having a first slot formed therein;

an applique proximate said housing, said applique having a pair of spring mounts;

an elongated bracket mounted within said cavity, said bracket having a length and said bracket having a first key formed therein for insertion into said first slot; and a pair of springs, each of said springs having a first end and a second end, said first end of said spring coupled to one of said pair of spring mounts, said second end of each of said pair of springs mounted to said bracket through said opening.

35. A breakaway mirror as recited in claim 34, wherein said housing having a second slot and said bracket having a second key formed therein sized to be received within said second slot.

36. A breakaway mirror as recited in claim 35, wherein said second key is formed at an opposite end of said bracket than said first key.

37. A breakaway mirror as recited in claim 34, wherein said housing has a forward most position and a rearward most position with respect to said applique, said opening in said housing sized so that said pair of springs do not contact said housing in either said forward most position or said rearward most position.

38. A breakaway mirror assembly for mounting to a door of an automotive vehicle comprising:

a mirror;

a housing defining a cavity sized to receive said mirror and having an opening;

an applique proximate said housing, said applique having a pair of spring mounts pivotally fixed with respect to said applique;

an elongated bracket mounted within said cavity, said bracket having a major length; and a pair of springs, each of said springs having a first end and a second end, said first end of said spring coupled to one of said pair of spring mounts, said second end of each of said pair of springs mounted to said bracket through said opening, and wherein said springs are perpendicular to a radius of a curvature of rotation through which said housing rotates with respect to said applique in a forward direction or rearward direction.

* * * * *